R. L. LIGHT.
TRAP.
APPLICATION FILED AUG. 15, 1913.

1,111,596.

Patented Sept. 22, 1914.

Inventor
R. L. Light.

Witnesses
F. H. Taylor
Allen F. Stevens

By Victor J. Evans
Attorney

UNITED STATES PATENT OFFICE.

ROBERT L. LIGHT, OF WRISTON, WEST VIRGINIA, ASSIGNOR OF ONE-HALF TO W. L. COEN, OF OAK HILL, WEST VIRGINIA.

TRAP.

1,111,596.      Specification of Letters Patent.      Patented Sept. 22, 1914.

Application filed August 15, 1913. Serial No. 784,947.

*To all whom it may concern:*

Be it known that I, ROBERT L. LIGHT, a citizen of the United States, residing at Wriston, in the county of Fayette and State of West Virginia, have invented new and useful Improvements in Traps, of which the following is a specification.

This invention relates to traps, and it has particular reference to that class of traps which are self-setting; that is to say, in which, after the entrance of a victim the trap is immediately and automatically reset for the next victim.

The invention has for its object to produce a trap of the class described of simple and improved construction, the same embodying a victim receptacle, a lid, and an automatic trap door associated with the lid.

A further object of the invention is to provide a trap of the class described having a reversible lid which may be set or arranged with either side uppermost to constitute a funnel whereby the victim will be guided in the direction of the trap door.

A further object of the invention is to simplify and improve the construction and arrangement of the revolving trap door.

With these and other ends in view which will readily appear as the nature of the invention is better understood, the same consists in the improved construction and novel arrangement and combination of parts which will be hereinafter fully described and particularly pointed out in the claims.

In the accompanying drawing has been illustrated a simple and preferred form of the invention, it being, however, understood that no limitation is necessarily made to the precise structural details therein exhibited, but that changes, alterations and modifications within the scope of the claims may be resorted to when desired.

Figure 1:
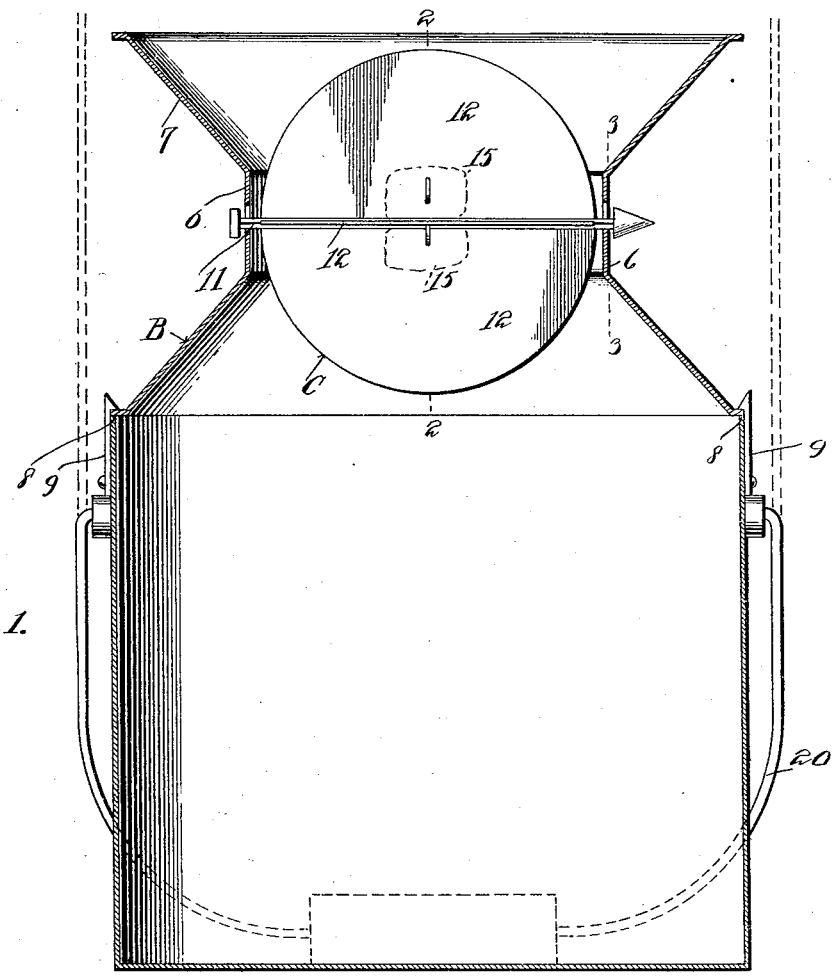
Figure 3:
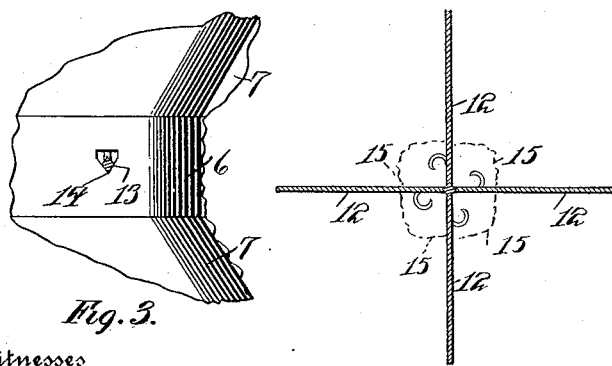
Figure 4:
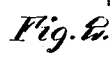
Figure 2:
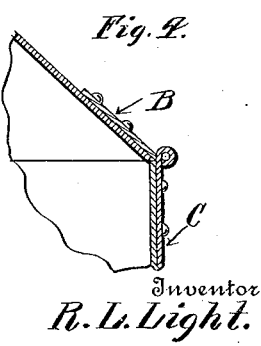

In the drawing,—Figure 1 is a vertical sectional view of a trap constructed in accordance with the invention. Fig. 2 is a sectional detail view taken on the line 2—2, at right angles to Fig. 1. Fig. 3 is a sectional detail view taken on the line 3—3 in Fig. 1. Fig. 4 is a sectional detail view illustrating a slight modification.

The improved trap includes a cylindrical receptacle 5 having a detachable lid B in which a trap door C is mounted for rotation. The lid B consists of an intermediate cylindrical portion 6, the ends of which are provided with bearing flanges 7 projecting upwardly and downwardly so as to present an approximately hour-glass shaped contour. The flanges 7 are of like dimensions, and said flanges are made of suitable dimensions to engage the top of the receptacle 5 which may be formed with a shoulder 8 for the reception of one of the flanges. Suitable catches 9 may be provided to enable the lid to be retained securely in position on the receptacle. In place of one of the catches, however, a hinge may be used, as shown in Fig. 4, to connect the lid with the receptacle.

The trap door C comprises a shaft 11 from which four semi-circular leaves 12 extend radially at intervals of 90 degrees, said shaft being square in cross section, and the leaves being arranged so as to project from the angles at the four corners of the shaft. The ends of the shaft which project beyond the leaves are supported for rotation in slots 13 formed in diametrically opposite sides of the cylindrical portion 6 of the lid, said slots having V-shaped lower ends, as seen at 14, wherein the journal portions of the shaft will normally come to a rest, thus presenting two of the leaves in an approximately horizontal position and the two intersecting leaves in an approximately vertical position, the opening in the lid being obstructed by the horizontally disposed leaves. At the same time, it will be readily seen that a comparatively light weight imposed on either of the horizontal leaves will serve to turn the trap door about its axis until the next angle or corner of the shaft is gravitationally reseated in the V-shaped notch 14.

Bait may be placed and secured in any suitable manner, as shown at 15, in the corners between the leaves or pedals 12 of the trap door.

The device is provided with a bail or handle 20 whereby it may be conveniently manipulated and carried from place to place.

When the trap is baited and the lid is placed in position on the receptacle, it may be placed in some position where it will be conveniently accessible to the victims, or a plank may be placed in an inclined position to lead to the upper edge of the lid where the victims being attracted by the odor of the bait will attempt to reach the same, and in so doing will alight on either one of the horizontal pedals, causing the back door to be displaced from its position and to make a quarter revolution, with the result of depositing the victim within the receptacle and resetting the trap. It is obvious that the inclined flange of the lid which is uppermost will guide the victim in the direction of the trap door so that when once started on the way there will be no chance of escape.

Having thus described the invention, what is claimed as new, is:—

1. In a trap, a receptacle, a lid including a hollow cylindrical portion, the wall of which is provided with diametrically opposite slots having V-shaped lower ends, a trap door including a shaft of square cross section supported for rotation in the slots, and semi-circular pedals extending radially from the corners of the shaft.

2. In a trap, a receptacle, a lid member supported thereon and having upwardly and downwardly extending flaring flanges and an intermediate portion provided with diametrically opposite slots having V-shaped lower ends, a shaft of square cross section supported for free rotation in said slots with two side walls normally in engagement with the V-shaped lower portions of the slots, and pedals extending radially from the corners of the shaft.

3. In an animal trap, a trap door device comprising a shaft of square cross section, pedals extending radially from the corners of the shaft, and supporting means for the shaft having slots with V-shaped lower ends that constitute the shaft bearings whereby the trap door will be maintained automatically in set position against a slight pull but allowing it to be moved under a stronger pull.

In testimony whereof I affix my signature in presence of two witnesses.

ROBERT L. LIGHT.

Witnesses:
J. C. McNeer,
Margaret McNeer.

---

Copies of this patent may be obtained for five cents each, by addressing the "Commissioner of Patents, Washington, D. C."